(12) United States Patent
Kaku

(10) Patent No.: US 6,217,449 B1
(45) Date of Patent: Apr. 17, 2001

(54) IMAGE GENERATING DEVICE AND INFORMATION STORAGE MEDIUM

(75) Inventor: Ryoichi Kaku, Yokohama (JP)

(73) Assignee: Namco Ltd., Tokyo (JP)

( * ) Notice: Subject to any disclaimer, the term of this patent is extended or adjusted under 35 U.S.C. 154(b) by 0 days.

(21) Appl. No.: 09/203,336

(22) Filed: Dec. 2, 1998

(30) Foreign Application Priority Data

Dec. 5, 1997 (JP) .................................................... 9-352479

(51) Int. Cl.⁷ ...................................................... A63F 9/24
(52) U.S. Cl. .................................. 463/36; 463/7; 463/23
(58) Field of Search .................................... 463/7, 23, 31, 463/36; 434/255

(56) References Cited

U.S. PATENT DOCUMENTS

| | | | |
|---|---|---|---|
| 4,630,817 | * | 12/1986 | Buckley .................................... 273/73 |
| 5,591,104 | * | 1/1997 | Andrus et al. ........................ 434/247 |
| 5,860,861 | * | 1/1999 | Lipps et al. ............................. 463/36 |
| 5,947,824 | * | 9/1999 | Minami et al. ......................... 463/31 |
| 6,024,675 | * | 2/2000 | Kashiwaguchi ........................ 463/36 |

* cited by examiner

Primary Examiner—Peter Vo
Assistant Examiner—John Paradiso
(74) Attorney, Agent, or Firm—Oliff & Berridge, PLC

(57) ABSTRACT

The object is the provision of an image generating device and information storage medium such that even a player of low strength or the like can smoothly move a moving body in an object space. Based on a pedaling force PF corresponding to kinetic energy input using pedals, and a course attractive force AF pulling in the direction of progress along a course in object space, a moving body is moved along the course in the object space. The kinetic energy is obtained, for example, by a player moving an operating means with a hand or foot. The course is given vertical relief, and moving body is moved based on PF, AF, and gravity. When the moving body is on a level ground, or when the pedals are not being turned the course attractive force AF is disabled. In the case of a multi-player game in which a plurality of moving bodies are moving, the magnitude of the course attractive force AF is varied according to the distance from the moving body in first position or the rank order of the moving bodies. The present invention can be applied to a bodily sensing game such as a bicycle, boat, or animal racing game.

20 Claims, 15 Drawing Sheets

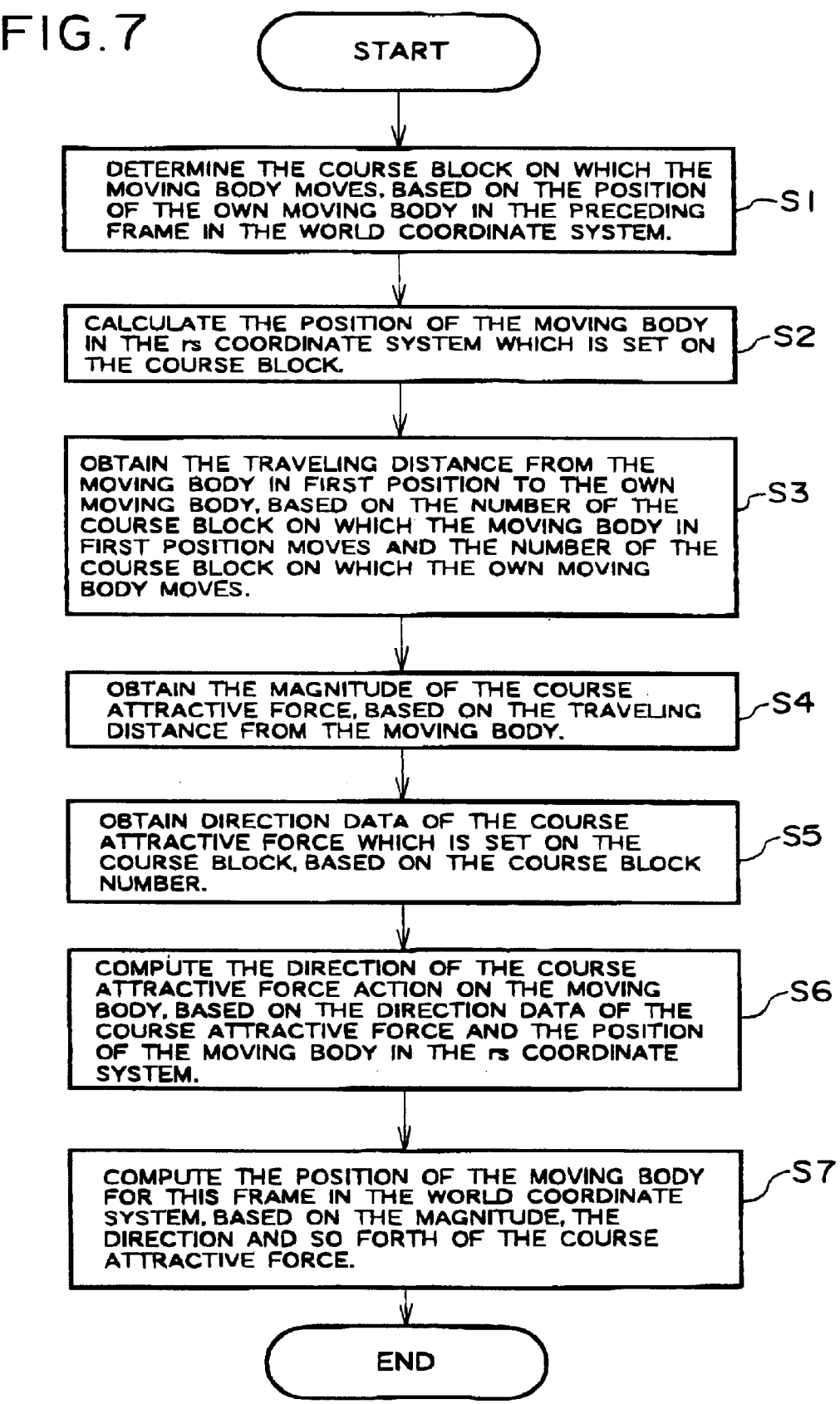

FIG. 10A

| DISTANCE FROM MOVING BODY IN THE FIRST POSITION | COURSE ATTRACTIVE FORCE MAGNITUDE |
|---|---|
| 0 | 0.1 MG |
| 5 | 0.2 MG |
| 20 | 0.3 MG |
| 50 | 0.4 MG |
| 100 | 0.5 MG |
| 300 | 0.7 MG |
| 9999 | |

FIG. 10B

| COURSE BLOCK NUMBER | COURSE ATTRACTIVE FORCE DIRECTION |
|---|---|
| 0 | $r_0$, $S_0$ |
| 1 | $r_1$, $S_1$ |
| 2 | $r_2$, $S_2$ |
| 3 | $r_3$, $S_3$ |
| | |

IMAGE GENERATING DEVICE AND INFORMATION STORAGE MEDIUM

BACKGROUND OF THE INVENTION

1. Field of the Invention

The present invention relates to an image generating device and information storage medium, which generates an image seen from a given viewpoint in an object space.

2. Prior Art

Conventionally, image generating devices have been developed and put into practice, which dispose a number of objects in an object space which is a virtual three-dimensional space, and generate the image within the object space seen from a given viewpoint; these have become popular as a means of experiencing so-called virtual reality. To take an image generating device providing a rafting game as an example, a player rows with his own hands an oar provided as an operating means to propel a moving body such as a boat within object space, to enjoy an "experience" game. This is to say, a force corresponding to the kinetic energy of the movement of the player's legs and arms moves a moving body, and thereby the moving body is propelled through object space.

However, in this type of bodily sensing game, there is the problem that a player of low strength, or a player whose movements are slow, when compared with a player of high strength, or a player whose movements are fast, has difficulty in smoothly propelling the moving body. Further, to make the game more interesting, the course is preferably provided with vertical relief, but when such vertical relief is provided, a player of low strength or a player whose movements are slow finds it even more difficult to propel the moving body smoothly along the course.

SUMMARY OF THE INVENTION

The present invention is made as a result of considering the above described problems, and has as its object the provision of an image generating device and information storage medium such that even a player of low strength or of slow movements can smoothly move a moving body in an object space.

In order to achieve this object, the present invention is an image generating device generating an image seen from a given viewpoint in an object space, comprising:

means for performing calculation to move at least one moving body along a course in object space based on at least a first force being a force corresponding to kinetic energy of movements of a player input by an operating means and a second force being a force pulling along a progressing direction of the course in object space; and means for generating an image seen from a given viewpoint in object space.

In addition to the first force which is a force corresponding to the kinetic energy which is input by using the operating means, a second force, pulling the moving body along the progressing direction of the course, also acts on the moving body. Moreover, since this second force acts on the moving body to move it in the progressing direction along the course, a player of low strength, a player whose movements are slow, or the like is able to smoothly move the moving body along the course, with the assistance of this second force.

It should be noted that the first force may be a force corresponding to kinetic energy which is input by using an operating means, and for example, may be a force which increases when the kinetic energy is high, and decreases when the kinetic energy is low. Therefore, when determining the magnitude and direction of this first force, it is not necessary to directly detect the kinetic energy, and the decision may be based on the movement velocity, rotation velocity or the like, of a member making up the operating means.

As an aspect of the present invention, the kinetic energy is obtained by moving operating means using a player's limb. In a bodily sensing game of the type where a player moves a hand or foot to propel a moving body forward, a player with a weak hand or foot, or a player unable to move a hand or foot rapidly is not able to propel the moving body smoothly, and is not able to enjoy the game. However, since the second force acts on the moving body to assist the player, the present invention enables even such a player to enjoy this type of bodily sensing game.

As another aspect of the present invention, the course has vertical relief, and the moving body is moved along the course based on the first and second forces, and a gravity acting in the vertical direction. By this means, a player feels a sensation of gravity on a complicated course with vertical relief (ups and downs), while being able to move the moving body. Thus the player can be given an enhanced sense of virtual reality. Moreover, when a course is given vertical relief in this way and at the same time gravity acts on the moving body, climbing an uphill slope becomes difficult. However, with the present invention, since the second force assists on the moving body, even a player of low strength or the like is able to enjoy the game.

As yet another aspect of the present invention, the second force acting on the moving body is cancelled when the moving body is in a given state. In this way, the occurrence of a situation such that the moving body which should be stationary is moved by the second force and would impart to the player an unnatural sensation, is effectively prevented.

As still another aspect of the present invention, when there is a plurality of moving bodies, the magnitude of the second force is varied according to at least one of a distance between moving bodies and rank order of moving bodies. In this way, since a large second force acts on a moving body which has become a long distance from other moving bodies or fallen behind in the rank order, thus allowing a game of red-hot competition to realize a dead heat.

As a further aspect of the present invention, the further the distance from moving body in the lead on the course, the second force is made larger. As yet further aspect of the present invention, the lower the rank order of a moving body, the second force is made larger. In this case, there are various possibilities which may be considered as the distance, among them, for example, the traveling distance between the moving bodies or the straight line distance.

As a still further aspect of the present invention, the movement of one of a bicycle, a boat, and an animal is simulated. In this way, a game of red-hot competition using a bicycle, a boat, an animal, or the like, may be enjoyed by a player.

BRIEF DESCRIPTION OF THE DRAWINGS

FIG. 7 is a flowchart describing a detailed example of the processing of the present embodiment.

FIGS. 10A and 10B illustrates tables of the magnitude data and direction data of course attractive force.

PREFERRED EMBODIMENT OF THE INVENTION

The present invention is now described in terms of a preferred embodiment, with reference to the drawings. It should be noted that below the present invention is described by an example applied to a bicycling game, but the present invention is not limited to this.

Figure 1:
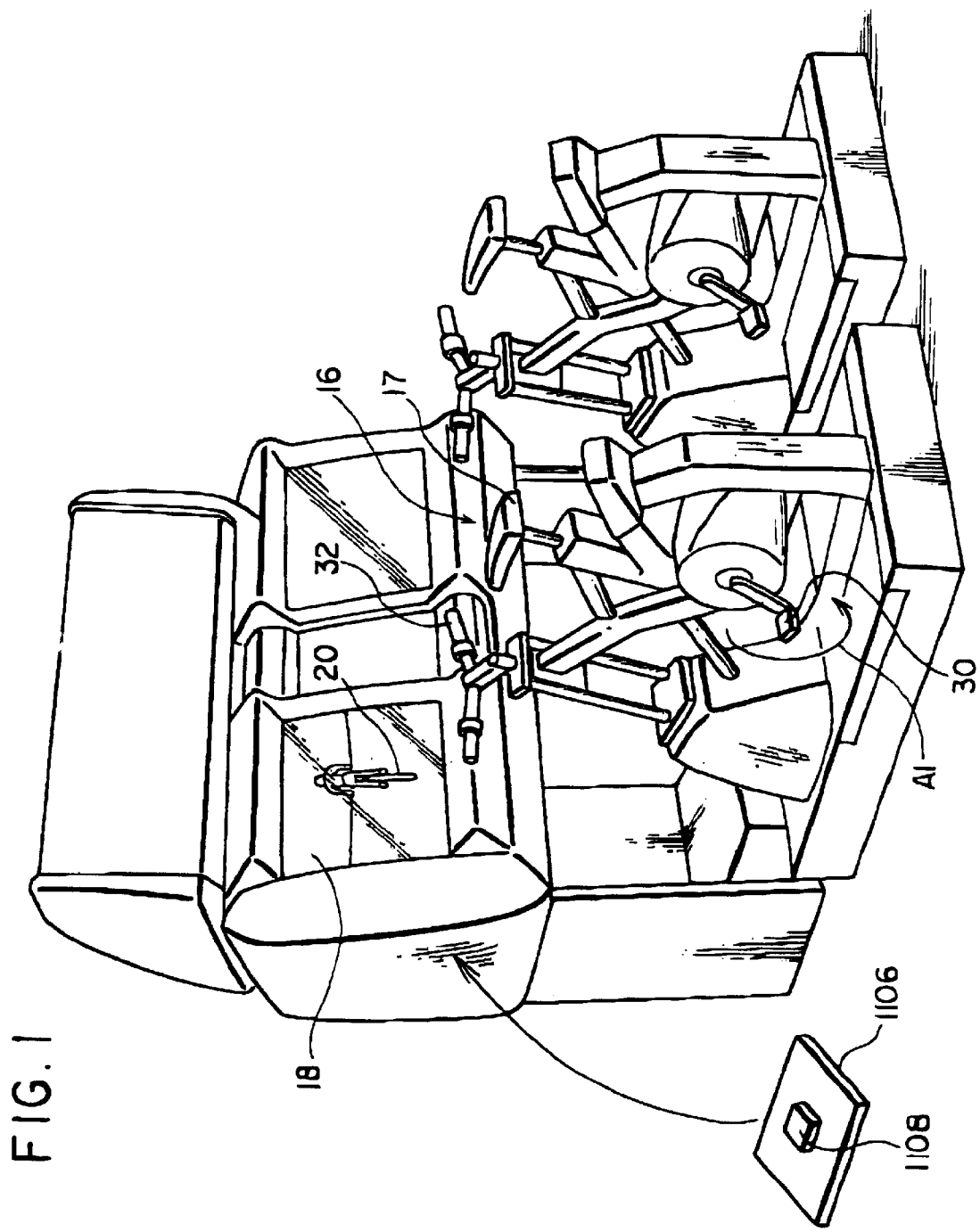
FIG. 1 is an example of an external view of the embodiment of an image generating device.

In FIG. 1 is shown the external appearance of an example in which the present embodiment of the image generating device is applied to an arcade game device.

Here a ride housing 16 is a model of a real bicycle, and a player not shown in the drawing sits on a saddle 17 of the ride housing 16. A display 18 shows a moving body 20, being a virtual bicycle, the course being traveled by the moving body 20, and the surrounding scenery. The player watches this image, and moves the handles 32 to left and right, to determine the course of the moving body 20 shown on the display 18. By pedaling of the pedals 30 as shown by the arrow A1, the moving body 20 is propelled along the course. That is to say, a force corresponding to the kinetic energy caused by the movement of the player's foot acts on the moving body 20. and thereby the moving body 20 moves in object space along the course.

Figure 2:
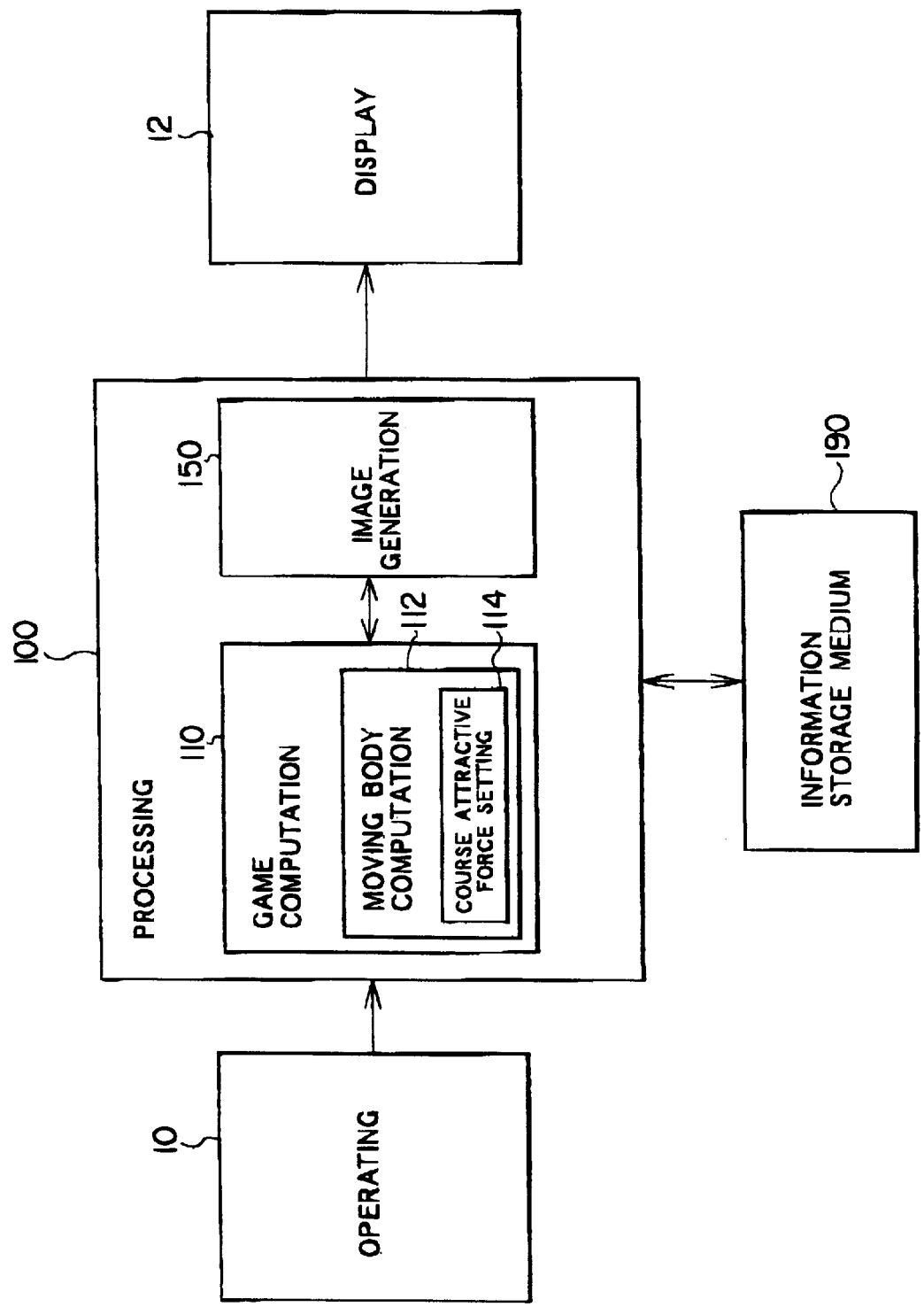
FIG. 2 is a functional block diagram of the present embodiment of the image generating device.

In FIG. 2 is shown a functional block diagram of the present embodiment of the image generating device.

An operating section 10 serves for input of operating data relating to the player operating the handles 32 shown in FIG. 1 and pedaling the pedals 30, and the operating data obtained by the operating section 10 is input to a processing section 100.

The processing section 100 carries out processing of the disposition of display objects in object space, and the generating of an image of this object space from a given viewpoint, based on the above described operating data, a given program, and the like. The function of this processing section 100 can be realized by a CPU (CISC type or RISC type), a DSP, an image generation ASIC, and other hardware.

An information storage medium 190 stores the program and data. The function of this information storage medium 190 may be realized by a CD-ROM, a game cassette, a IC card, a magneto-optical disk, a floppy disk, a DVD, a hard disk, memory, or other hardware. The processing section 100 carries out processing on the basis of various program and data from this information storage medium 190.

The processing section 100 includes a game computation section 110 and an image generation section 150.

Here the game computation section 110 carries out game mode setting processing, game progress processing, processing of deciding the position and orientation of moving body, processing of deciding viewpoint position and viewing angle, processing of the disposition of display objects in object space, and the like.

The image generation section 150 processes the generation of an image seen from a given viewpoint in the object space set by the game computation section 110. The image generated by the image generation section 150 is displayed in a display section 12.

The game computation section 110 includes a moving body computation section 112, and the moving body computation section 112 includes a course attractive force settings section 114.

Here the moving body computation section 112 performs a computation to move a moving body operated by the player or a moving body whose movement is controlled by a given control program (computer) along the course in the object space, based on operating data input from the operating section 10 and a given program. More specifically, the position and orientation of the moving body are calculated, for example, every frame (1/60 second).

For example, suppose that at frame (k−1) the position of a moving body is PMk−1, velocity is VMk−1, and acceleration is AMk−1, and that the time of 1 frame is Δt. Then at frame k, the position of the moving body PMk, and the velocity VMk may be found for example from the following expressions (1) and (2).

$$PMk = PMk{-}1 + VMk{-}1 \times \Delta t \quad (1)$$

$$VMk = VMk{-}1 + AMk{-}1 \times \Delta t \quad (2)$$

Figure 3:
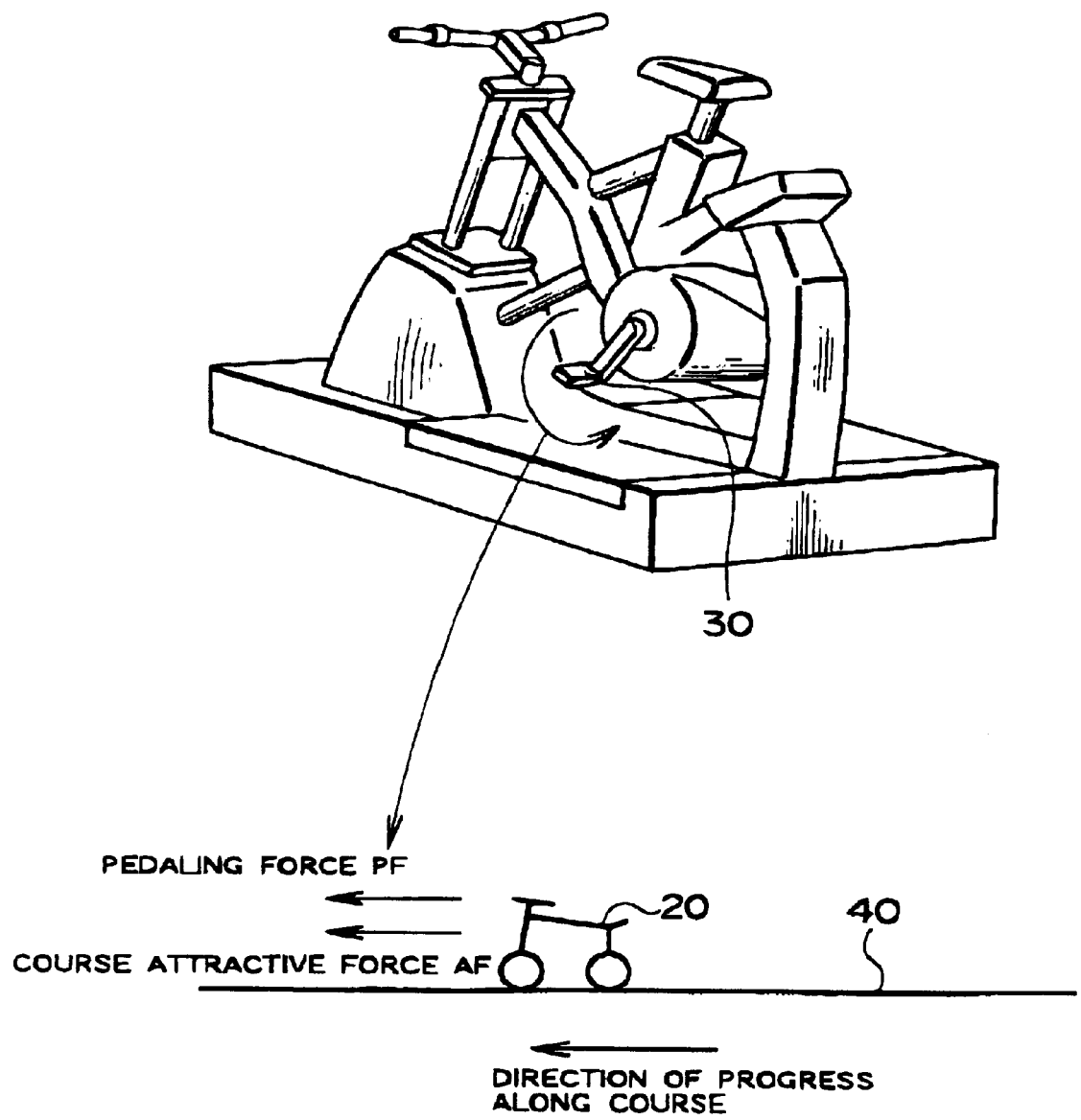
FIG. 3 illustrates the operating principle of the present embodiment.

The first characteristic of the present embodiment is that, as shown in FIG. 3, the moving body 20 is moved along a course 40 based on the pedaling force PF (first force) corresponding to the kinetic energy of the player pedaling the pedals 30 and the course attractive force AF (second force) pulling in the direction of progress of the course 40 in object space. Here the determination of the course attractive force acting on the moving body 20 is made by the course attractive force setting section 114 in FIG. 2. The magnitude of the pedaling force PF is determined from for example the rotation speed of the pedals 30.

With the course attractive force AF thus acting on the moving body 20, even for a player of low strength or a player whose movements are slow, such as a child, a woman, or an aged person, with the help of the course attractive force AF, the moving body 20 can be moved smoothly along the course 40 in the object space.

In other words, in this type of bodily sensing game (experience game), the faster the pedals 30 are pedaled, that is, the higher the kinetic energy of the player's movements, the higher the velocity of the moving body 20. However, since a player of low strength or a player whose movements are slow, such as a child, a woman, or an aged person, is not generally able to pedal the pedals 30 at a high speed, it is not possible to propel the moving body 20 forward at a high speed. Therefore, there is the problem that this type of bodily sensing game tends to be avoided by players of low strength and the like.

According to the present embodiment, in addition to the pedaling force PF generated by the player pedaling the pedals 30, the course attractive force AF which assists the player acts on the moving body 20. As a result, even for a player of low strength or a player whose movements are slow, the moving body 20 can be propelled forward at high speed. As a result, the problem of this type of player being put off from playing the game can be effectively prevented, and the rate of effective use of the device can be increased.

Figure 4A:
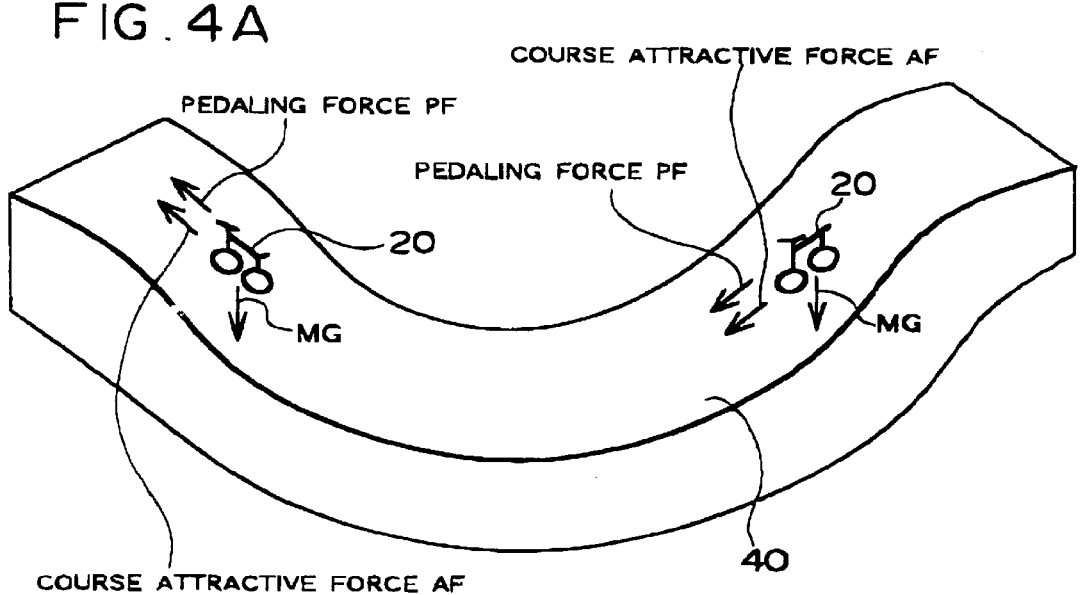
FIGS. 4A, 4B, and 4C illustrate examples where the course includes vertical relief.
Figure 4B:
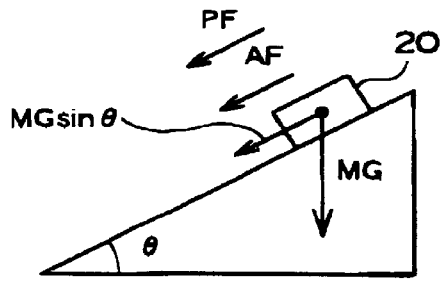
Figure 4C:
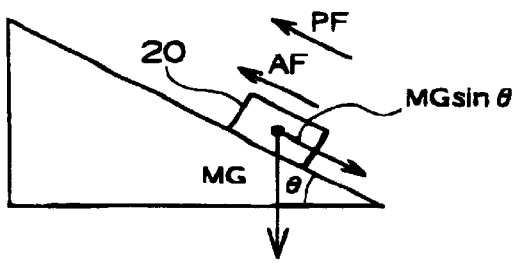

The second characteristic of the present embodiment is that, as shown in FIG. 4A, the course 40 is provided with vertical relief, and also in addition to the above described pedaling force PF and course attractive force AF, gravity MG acts on the moving body 20. By this means, when as shown in FIG. 4B the moving body 20 is going downhill (at an inclination Θ), in addition to the pedaling force PF and course attractive force AF, a force MGsinΘ acts on the moving body 20 in the same direction as PF and AF. As shown in FIG. 4C, when the moving body 20 is going uphill (at an inclination Θ), in addition to the pedaling force PF and course attractive force AF, a force MGsinΘ acts on the moving body 20 in the opposite direction to PF and AF.

Thus by giving the course 40 vertical relief, and making the form of the course 40 more complicated, the sense of virtual reality felt by the player can be enhanced, and the interest of the game can be further increased. By the gravity MG acting on the moving body 20 on a downhill slope, as shown in FIG. 4B, the velocity of the moving body 20 increases, and on an uphill slope, as shown in FIG. 4C, the velocity of the moving body 20 decreases. By this means, it is possible to simulate realistically the riding of a bicycle in the real world.

However, such an attempt to simulate faithfully the phenomena of the real world produces the following problem particularly on an uphill slope as shown in FIG. 4C. That is to day, because the gravity MG acting in the opposite direction of the pedaling force PF, a player of low strength or a player whose movements are slow becomes unable, however hard the pedaling, to propel the moving body 20 up the slope, or has problems. According to the present embodiment, in a case such as this, since the course attractive force AF, which is a force assisting the player's pedaling force PF, acts on the moving body 20, even if for example the player loses strength, or for example even on an uphill slope, the moving body 20 can be smoothly propelled along the course 40. Moreover, on a complicated course 40 having vertical relief, while feeling the presence of the gravity MG, the player is able to propel the moving body 20 to enjoy the game, and the player's sense of virtual reality can be increased.

Figure 5:
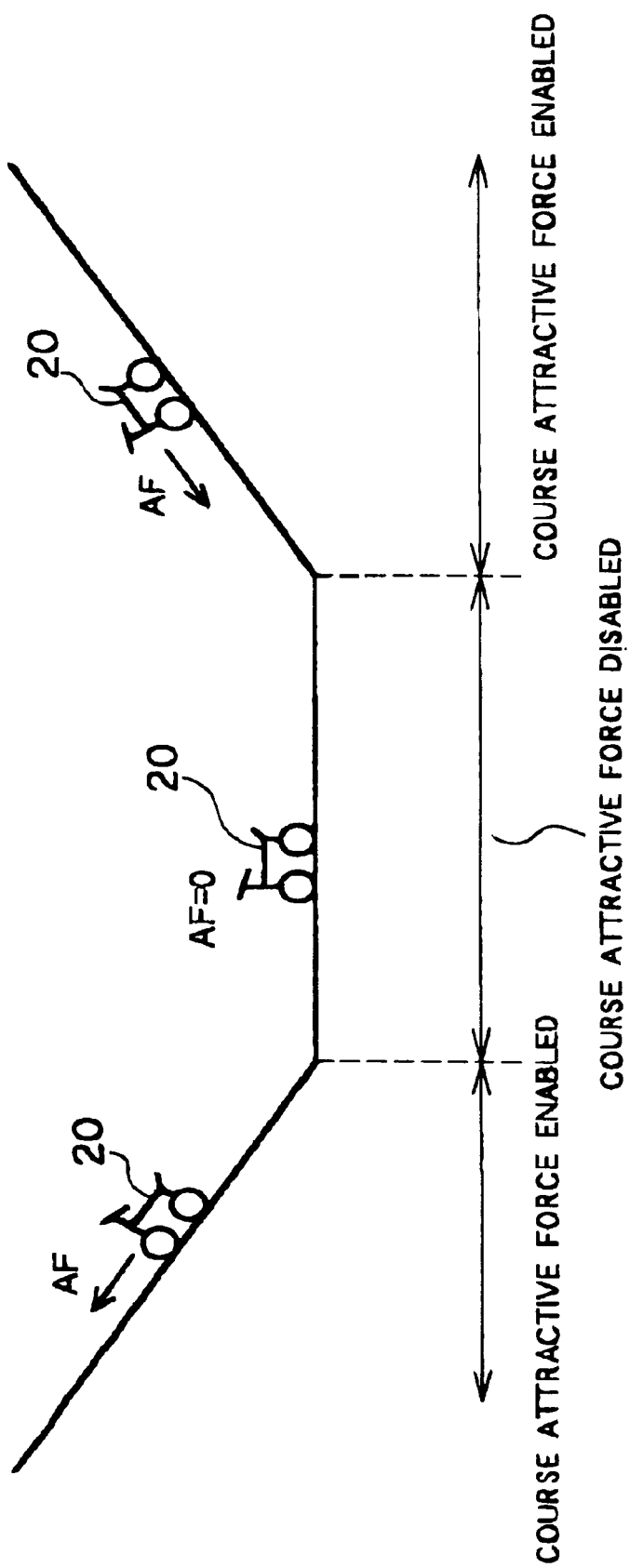
FIG. 5 illustrates a technique in which, in a given circumstance the course attractive force is rendered disabled.

The third characteristic of the present embodiment is that when the moving body is in a given state, the course attractive force acting on the moving body can be cancelled. More specifically, as shown in the FIG. 5, when the moving body 20 travels along a downhill slope or uphill slope the course attractive force AF acts on the moving body 20. On the other hand, when the moving body 20 is on a level ground, the course attractive force AF does not act on the moving body 20.

On a level ground, if the course attractive force AF moves the moving body 20 even though the player is not pedaling, the player is given an unnatural sensation. According to the present embodiment, when the moving body 20 is on a level ground the course attractive force AF is disabled, and for this reason the situation of the player being given an unnatural sensation is prevented.

It should be noted that various given conditions can be conceived for the course attractive force AF to be disabled. For example, when the moving body 20 is going downhill, the course attractive force AF may also be disabled. The course attractive force AF may also be disabled while the player is not pedaling.

The fourth characteristic of the present embodiment is that when there is a plurality of moving bodies, for example respective plural moving bodies for a plurality of players, the magnitude of the course attractive force is varied depending on the distance between moving bodies or the rank order of the moving bodies.

Figure 6A:
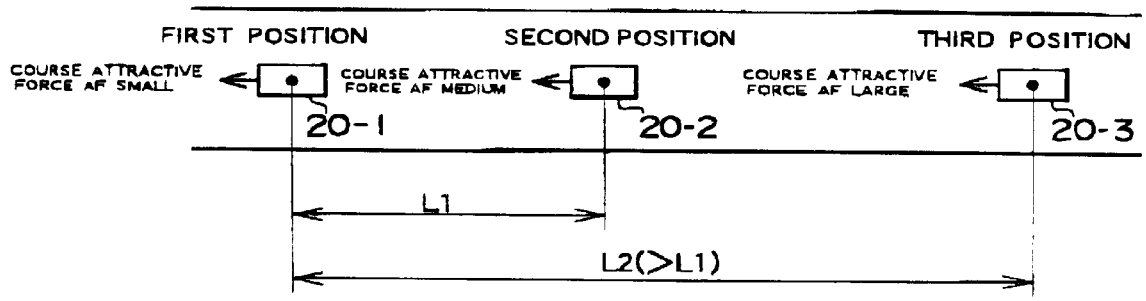
FIGS. 6A, 6B, and 6C illustrate a technique in which the course attractive force is varied depending on the distances between moving bodies and the sequence thereof.

More specifically, as shown in FIG. 6A, the smallest course attractive force AF acts on a moving body 20-1 in the lead on the course (AF may equally be disabled), a medium course attractive force AF acts on moving body 20-2 at a distance L1 from the moving body 20-1, and a large course attractive force AF acts on a moving body 20-3 at a distance L2 (>L1) from the moving body 20-1.

Alternatively, a small course attractive force AF may act on the moving body 20-1 since it is in first position, a medium course attractive force AF may act on the moving body 20-2 since it is in second position, and a large course attractive force AF may act on the moving body 20-3 since it is in third position.

The player for the moving body 20-3 which is in a low position and is a long way from the moving body 20-1 in first position may generally be considered to be a player who is weak, whose movements are slow, and whose pedaling power is low (the amount of kinetic energy able to be input being small). According to the present embodiment, the moving body 20-3 operated by such a player is subject to a large course attractive force AF. Therefore, a player of low strength or the like is assisted by this increased course attractive force AF, and can enjoy a strained racing game with a player of high strength or the like. By means of this, the phenomenon of playing the game being avoided by children, aged persons, women, and the like can be prevented, and a bodily sensing game can be provided which can be enjoyed by players regardless of age or sex.

Figure 6B:
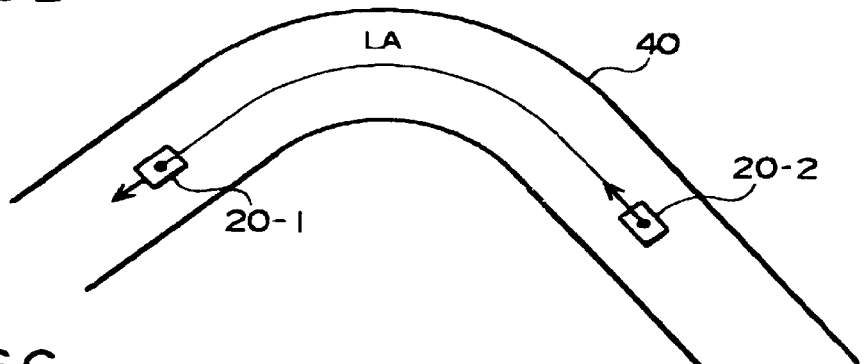
Figure 6C:
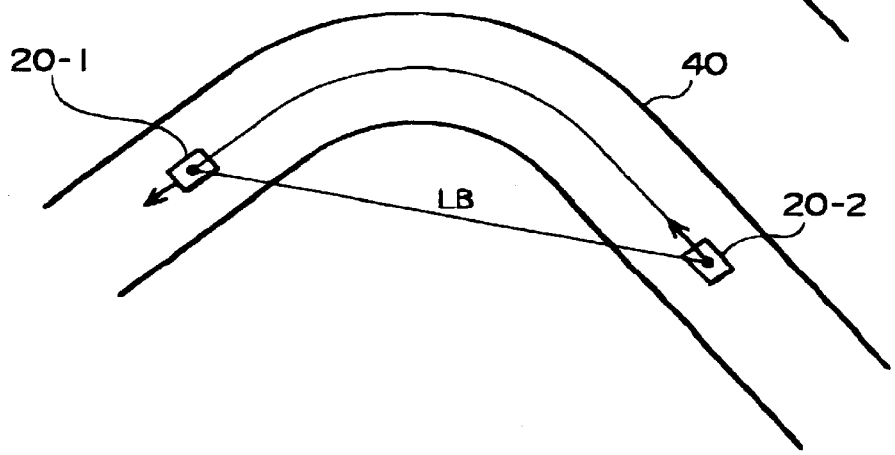

It should be noted that in the present embodiment, the magnitude of the course attractive force AF is determined based on the traveling distance LA along a course 40 as shown in FIG. 6. In the present embodiment, the traveling distance indicates a distance between moving bodies along the course where the moving body travels. This traveling distance can also be used for determining the rank order of the moving bodies. Therefore, by using this traveling distance for detrmining the magnitude of course attractive force AF, efficient use of the traveling distance is made possible. However, the distance used for determining the magnitude of the course attractive force AF is not limited to being the traveling distance. For example, the straight-line distance LB as shown in FIG. 6C, the depth distance, or various distances may be used.

Next detailed processing of the present embodiment is described, with reference to the flowchart of FIG. 7.

Figure 8A:
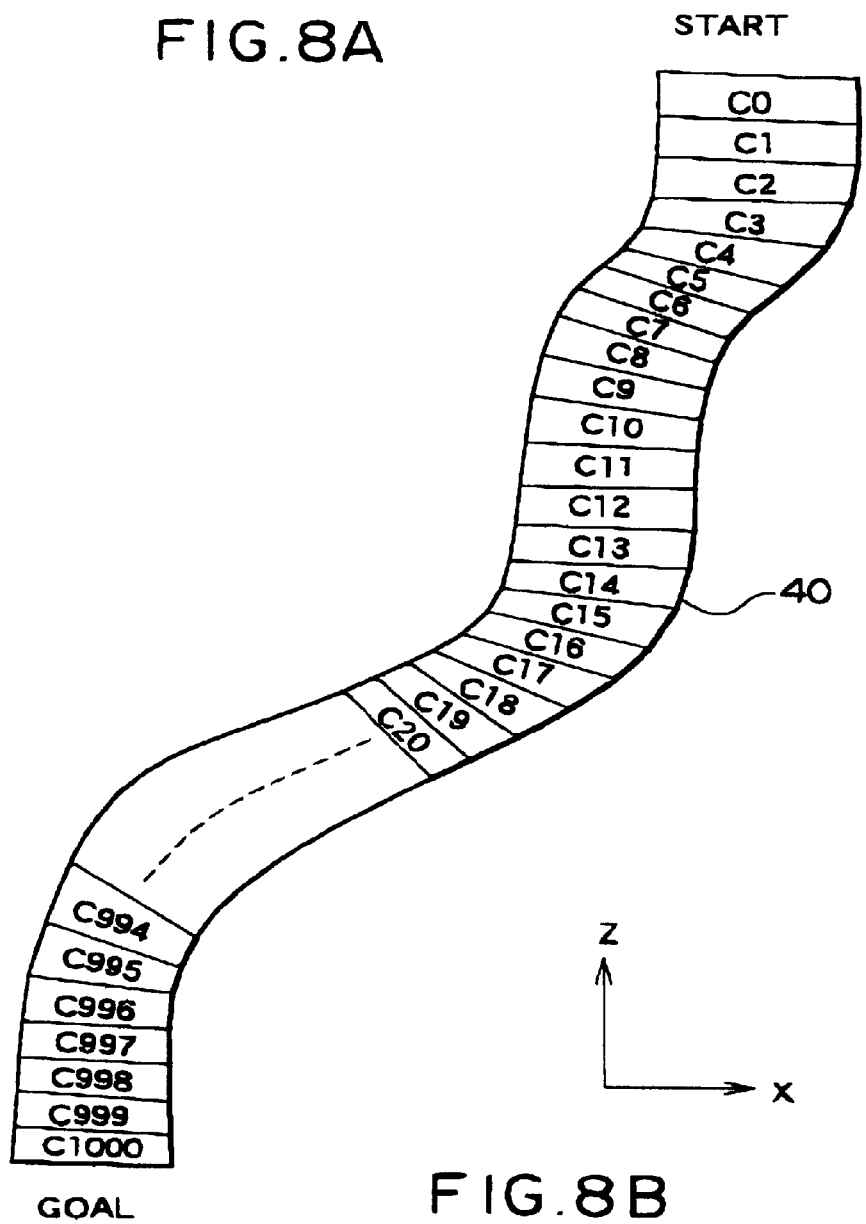
FIGS. 8A and 8B illustrates a course divided into blocks.
Figure 8B:
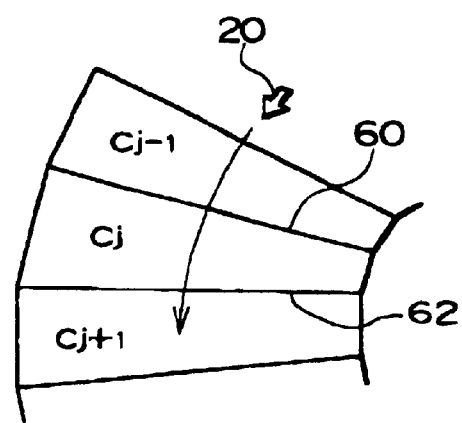

First, based on the position of the own moving body in the preceding frame in the world coordinate system, the course block on which the moving body moves is determined (step S1). That is to say, as shown in FIG. 8A, in the present embodiment, the course 40 is divided into a plurality of course blocks C0 to C1000. The course 40 is divided into course blocks at intervals of, for example, 1 meter in traveling distance. Then in FIG. 8B, whether or not a moving body 20 is within course block Cj is determined from disposition information of lines 60 and 62. Then in the present embodiment, based on this determination, the rank order of the moving body 20, whether time extension service is applicable, and so forth are decided. For example, if a first moving body is positioned in course block C18, and a pursuing second moving body is positioned in course block C17, the rank order of the first and second moving bodies is determined as first and second respectively. A decision is made as to whether or not players moving body passes a particular course block within a given time, and if so the player's playing time is extended.

Figure 9:
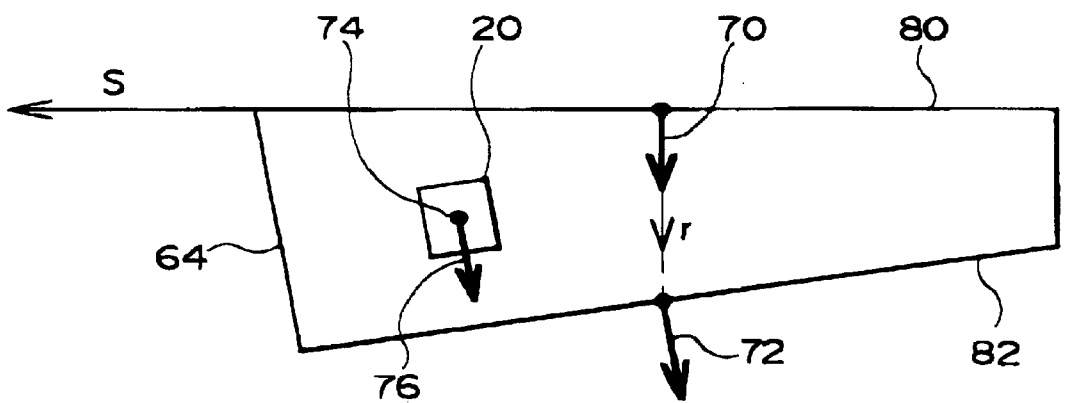
FIG. 9 illustrates a rs coordinate system used for a course block.

Next, the position of the moving body is calculated in the rs coordinate system of the course block in which it was determined in step S1 that the moving body is positioned (step S2). That is to say, the position of the moving body 20 is calculated in the rs coordinate system which is set on a course block 64 as shown in FIG. 9.

Next, based on the number of course block on which the moving body in the first position moves and the number of course block on which the own moving body moves, the traveling distance from the moving body in the first position to the own moving body is obtained (step S3). For example, if in FIG. 8A, the moving body in the first position is positioned in course block C20 (course block number 20), and the own moving body is positioned in course block C10 (course block number 10), then the traveling distance between the moving bodies is determined to be 20−10=10. Thus in the present embodiment, the course blocks used to determined the rank order and the like are used efficiently, and the traveling distance between moving bodies is obtained.

Next, based on the traveling distance between the moving bodies obtained in step S3, the magnitude of the course attractive force is obtained (step S4). That is to say, in the present embodiment, the course attractive force is determined according to the traveling distance from the moving body in first position, and therefore a table as shown in FIG. 10A is provided. Then based on this table the course attractive force acting on the moving body is determined. In the table shown in FIG. 10A, the course attractive force acting on the moving body in first position or a moving body whose traveling distance from the moving body in first position is from 0 to 5 is for example 0.1 MG (0.1 times the gravity MG). The course attractive force acting on a moving body at a traveling distance from the moving body in first position is 5 to 20, 20 to 50, 50 to 100, 100 to 300, or 300 to 9999 is respectively, for example, 0.2 MG, 0.3 MG, 0.4 MG, 0.5 MG, or 0.7 MG.

In the present embodiment, in this way, processing is carried out so that the further the traveling distance from the first position the larger the course attractive force acting on the moving body. However, instead of using a table like this, the magnitude of the course attractive force acting on the moving body may be determined by an appropriate calculation formula.

Next, based on the course block number, direction data of the course attractive force which is set on the course block is obtained (step S5). That is to day, in the present embodiment, to obtain direction data of the course attractive force relating to the course block, a table as shown in FIG. 10B is provided. Based on this table, direction data of the course attractive force relating to the course block in which the own moving body is positioned (the direction of vector 70 in FIG. 9), and direction data on the course attractive force relating to the next course block (direction of vector 72) is obtained.

Next, based on the direction data of the course attractive force obtained in step S5 and the position of the moving body in the rs coordinate system (position 74 in FIG. 9), the direction of the course attractive force acting on the moving body (direction of vector 76) is computed (step S6). That is to say, the directions of the vectors 70 and 72 are interpolated based on the position 74 of the moving body 20 to obtain the direction of the vector 76. For example, the interpolation computation is carried out in such a way that the direction of the vector 76 approaches the direction of the vector 70 as the moving body 20 approaches the line 80, and the direction of the vector 76 approaches the direction of the vector 72 as the moving body 20 approaches the line 82. The interpolation calculation of the direction of the vector 76 can be carried out based on the coordinate values.

Finally, based on the magnitude of the course attractive force obtained in step S4, the direction of the course attractive force obtained in step S6, the pedaling force, gravity, and so forth, the position of the moving body for this frame in the world coordinate system is computed (step S7).

In the above way, it is possible for the moving body to be propelled along the course while the course attractive force is acting.

Figure 11:
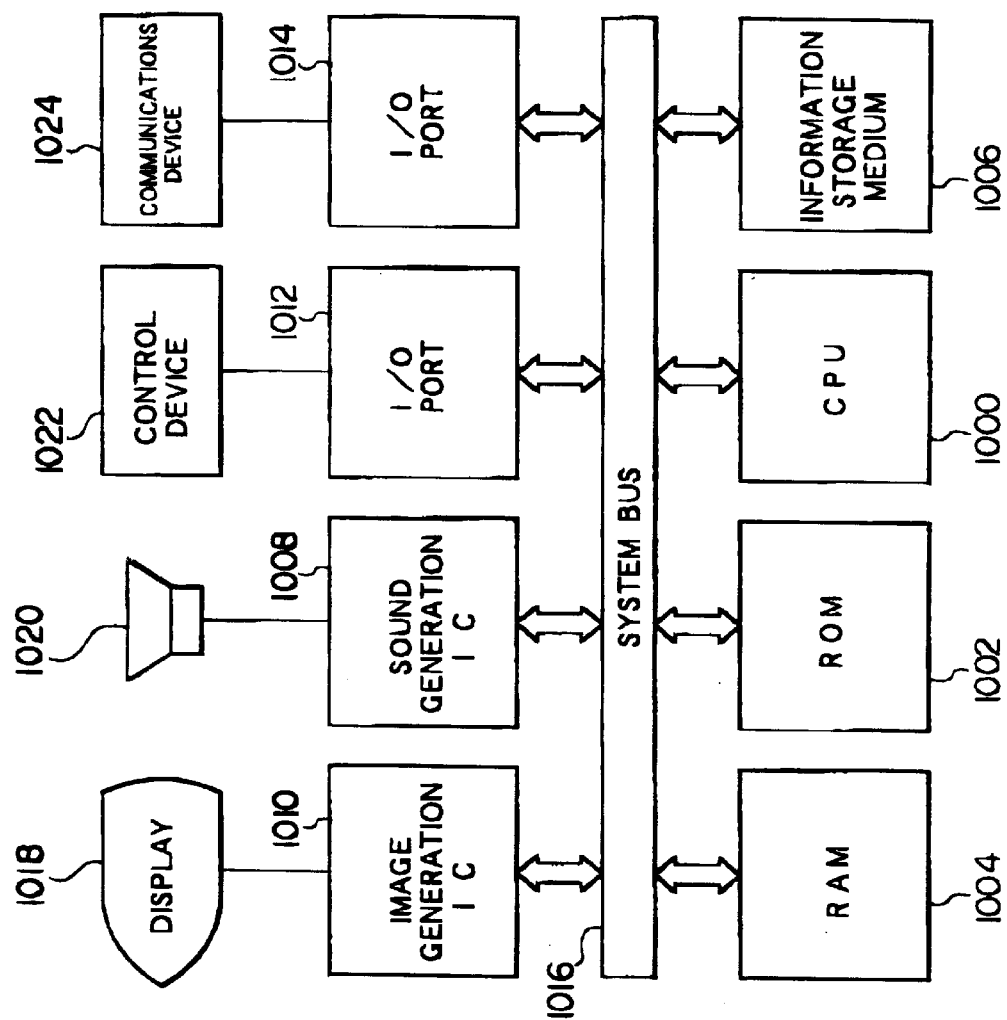
FIG. 11 shows an example hardware configuration capable of implementing the present embodiment.

Next, an example hardware configuration capable of implementing the present embodiment is described using FIG. 11. In the device shown in this figure, a CPU 1000, ROM 1002, RAM 1004, information storage medium 1006, sound generation IC 1008, image generation IC 1010, and I/O ports 1012 and 1014 are connected together to allow mutual data transfer by a system bus 1016. To the image generation IC 1010 is connected a display 1018, to the sound generation IC 1008 is connected a speaker 1020, to the I/O port 1012 is connected a control device 1022, and to the I/O port 1014 is connected a communications device 1024.

The information storage medium 1006 principally holds program, image data for displaying display objects, sound data, and so forth. For example, for a home game device, as the information storage medium for storing a game program and the like may be used a CD-ROM, game cassette, DVD, or the like. For an arcade game device memory such as a ROM is used, and in this case the information storage medium 1006 is the ROM 1002.

The control device 1022 is a game controller, operating panel, or similar device, and has the role of inputting to the system the decisions made by the player according to the progress of the game.

Following the program stored in the information storage medium 1006, the system program (information for initialization of the main device and the like) stored in the ROM 1002, and the signals input from the control device 1022, and the like, the CPU 1000 carries out various control of the whole device and data processing. The RAM 1004 is a storage means used as a working storage area or the like for the CPU 1000, and holds given information from the information storage medium 1006 or ROM 1002 or calculation results and the like from the CPU 1000. Data structures (for example the tables shown in FIGS. 10A and 10B) having a logical structure for the implementation of the present embodiment are built in RAM or on the information storage medium.

Further, a device of this type is provided with a sound generation IC 1008 and image generation IC 1010, so that game sound and game video can be optimally output. The sound generation IC 1008, based on information stored on the information storage medium 1006 and in the ROM 1002, and is an integrated circuit which generates sound effects, background music, and other game sound, and outputs the generated game sound to the speaker 1020. The image generation IC 1010 is an integrated circuit which based on image information transmitted from the RAM 1004, ROM 1002, information storage medium 1006, and the like, generates pixel information for output to the display 1018. It should be noted that as the display 1018 may also be used a so-called "head-mounted display" (HMD).

The communications device 1024 communicates various information used within the game device with the exterior, and connected to another game device to transmit and receive given information according to the game program, and is also used for transmitting and receiving game programs and the like through a communications circuit.

The various processing described in FIGS. 1 to 6C and FIGS. 8 to FIG. 10B, is realized by the information storage medium 1006 storing a program carrying out the processing shown in the flowchart shown in FIG. 7 and the like, the CPU 1000 operating according to this program, the image generation IC 1010, the sound generation IC 1008, and the like. If should be noted that processing carried out by the image generation IC 1010, the sound generation IC 1008, and the like may equally be carried out in software by the CPU 1000, a general-purpose DSP, or the like.

FIG. 1 described above is an example of application of the present embodiment to an arcade game device. In this case, a system circuit board 1006 built into the device has mounted thereon a CPU, image processing IC, sound generation IC, and the like. A memory 1108 (an information storage medium) on the system circuit board 1006 stores (a) information for performing calculation to move at least one moving body along a course in object space based on at least a first force being a force corresponding to kinetic energy of movements of a player input by an operating means and a second force being a force pulling along a progressing direction of the course in object space, (b) information for generating an image seen from a given viewpoint in object space, (c) information for cancelling the second force acting on the moving body when the moving body is in a given state, and (d) information for varying the magnitude of the second force according to the distance between moving bodies and the rank order of the moving body when there is a plurality of moving bodies. All of this information is hereafter referred to as "stored information." This stored information includes at least one of: program code for carrying out the above described various processing, image information, sound information, display object shape information, table data, list data, player information, and the like.

Figure 12A:
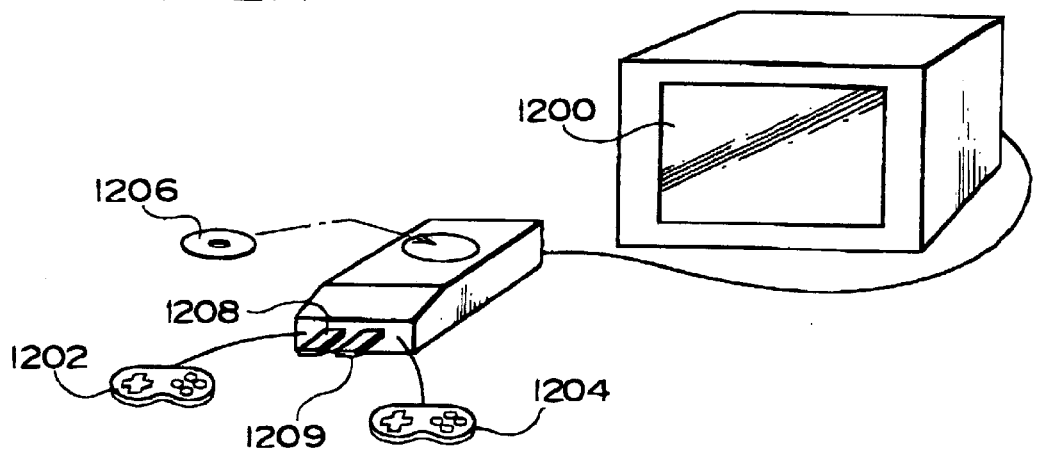
FIGS. 12A and 12B shows an example of a variety of devices to which the present embodiment can be applied.

FIG. 12A shows an example of the present embodiment applied to a home game device. Players watch a game image displayed in a display 1200, while operating game controllers 1202 and 1204 to enjoy the game. In this case, the above described stored information is stored in a CD-ROM 1206, IC cards 1208 and 1209, and the like, being information storage medium which can be freely connected to or detached from the main device.

It should be noted that in this case, the kinetic energy of a player's movement may be determined by for example the number of times a controller button is pressed or a lever is pushed down or the like.

Figure 12B:
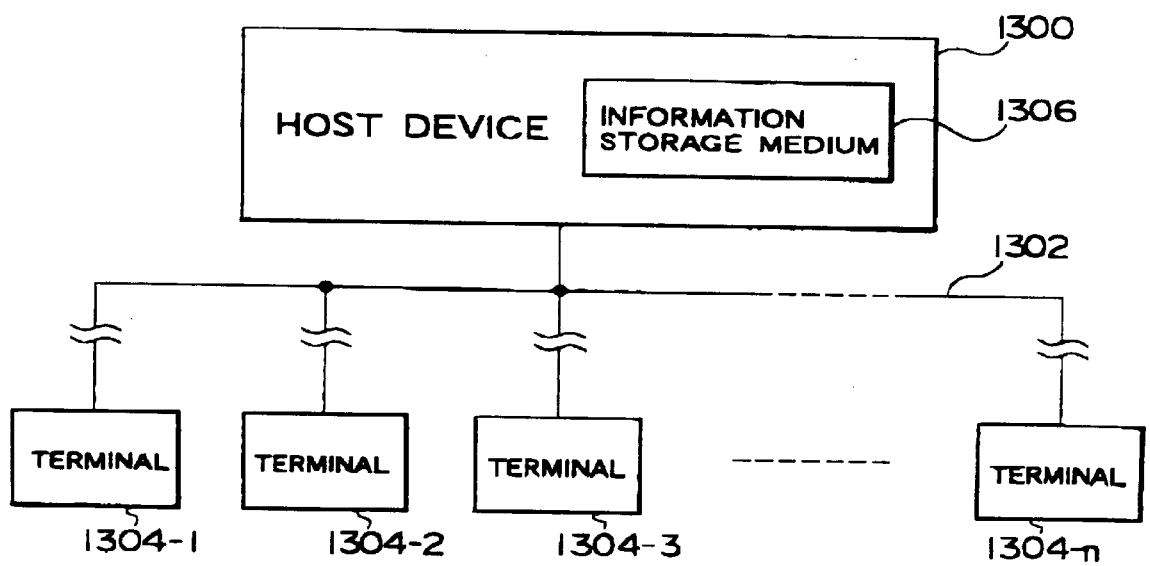

FIG. 12B shows an example of the present embodiment applied to a game device including a host device 1300 and terminals 1304-1 to 1304-n connected to the host device 1300 through a communications circuit 1302. In this case, the above described stored information is stored in for example a magnetic disk device, magnetic tape device, memory, or the like, being an information storage medium 1306 which can be controlled by the host device 1300. When the terminals 1304-1 to 1304-n have a CPU, image generation IC, and sound generation IC, and are capable of standalone generation of game images and game sound, then a game program or the like for generating game images and game sound may be distributed from the host device 1300 to the terminals 1304-1 to 1304-n. On the other hand, if they are not capable of standalone generation, the host device 1300 generates game images and game sound, and transfers these to the terminals 1304-1 to 1304-n, for output by the terminals.

It should be noted that the present invention is not restricted to the above described embodiment, and a variety of modification are possible.

For example, in the present embodiment the case has been described in which the present invention is applied to a bicycle racing game, but the present invention is not limited to this, and can be applied to a variety of games.

Figure 13:
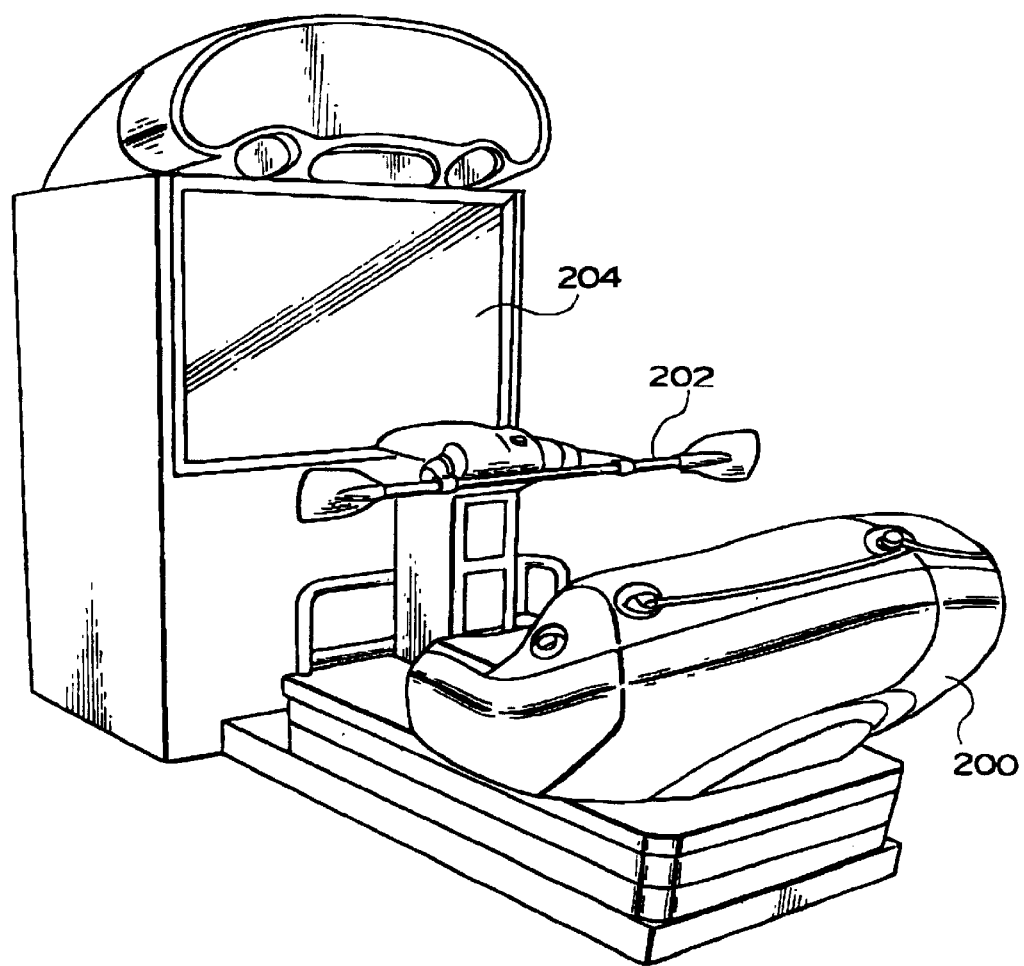
FIG. 13 illustrates an example of the present invention applied to a rafting game.

For example, FIG. 13 illustrates an example of the present invention applied to a rafting game (a game of going downstream in a boat). In this game a player sits in a seat 200, and rows an oar 202. Then the player enjoys the game propelling the boat displayed on a screen along a river course within object space. In this case, a rowing force corresponding to the player's kinetic energy input by rowing with the oar 202, a course attractive force, and the like act on the boat, to propel the boat along the river course. It should be noted that the rowing force, for example, can be determined by detected the operating velocity of the oar 202, and so forth.

Figure 14:
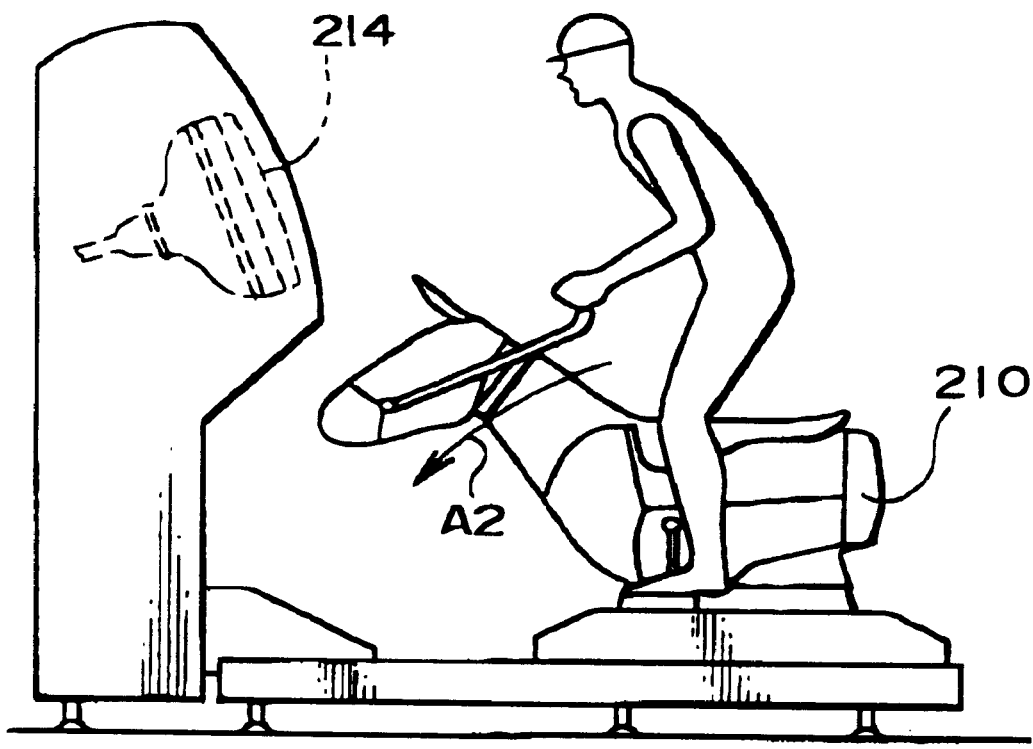
FIG. 14 illustrates an example of the present invention applied to a horse racing game.

FIG. 14 illustrates an example of the present invention applied to a horse racing game. In this game, a player rides on a ride housing 210 being an imitation of a horse, and as shown by the arrow A2, rocks the ride housing 210. Then a horse displayed on a display 214 has acting thereon a force corresponding to the kinetic energy due to this rocking (determined based on the rocking rate or the like) and a course attractive force, and the like, and this horse is propelled along a course.

Figure 15:
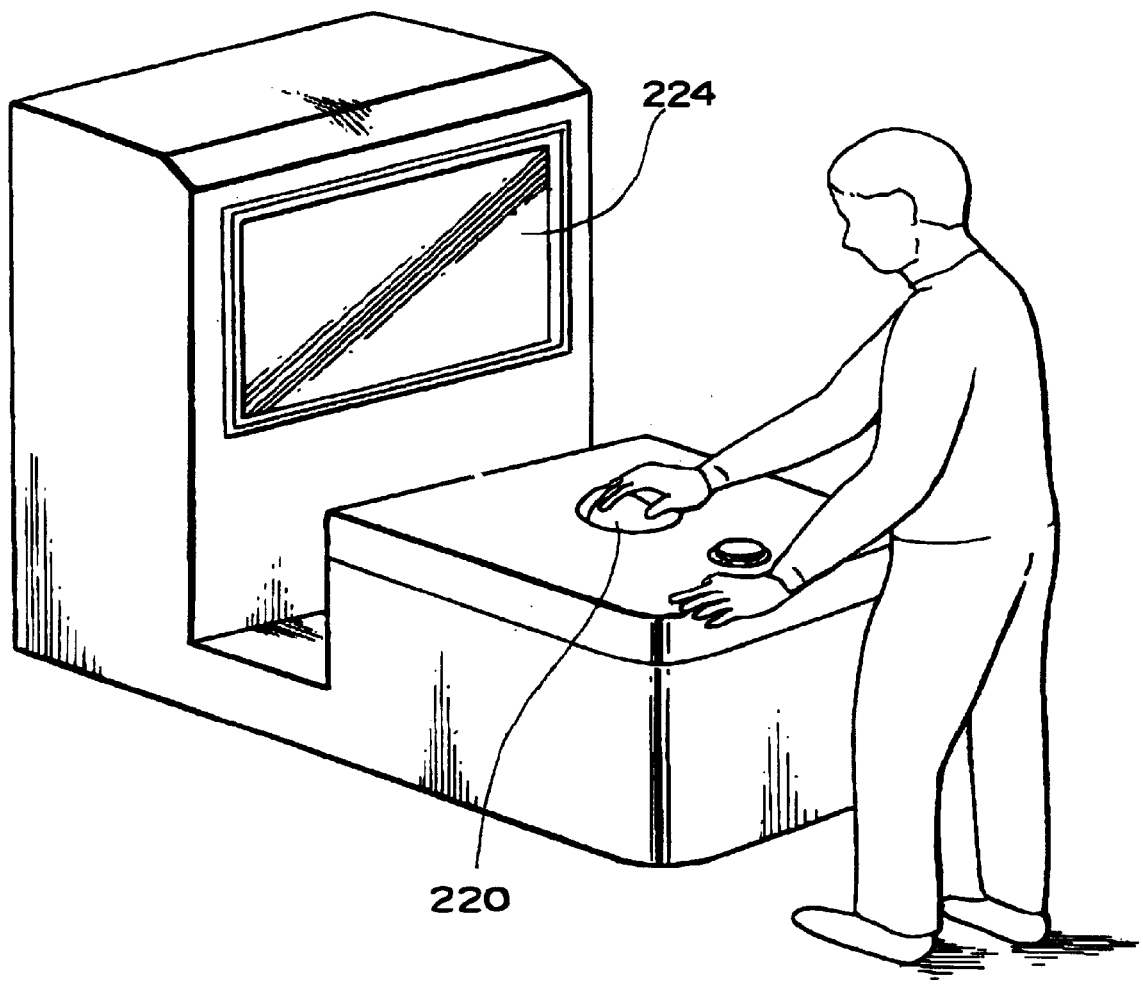
FIG. 15 illustrates an example of the present invention applied to an animal racing game.

FIG. 15 illustrates an example of the present invention applied to an animal racing game. In this game, a player rotates a trackball 220, to cause an animal in a display 224 to move along a course. The animal is affected by a force corresponding to the kinetic energy of rotation of the trackball 220 (determined by the rotation rate of the trackball 220 or the like), a course attractive force, and the like, and the animal is thus caused to travel along the course.

Otherwise, the present invention can be applied to various games, such as an athletics racing game in which a competitor is caused to run fast by rapid pressing of a button.

Moreover, the present invention is not limited to the technique of determining the magnitude and direction of the first force being a force corresponding to a player's kinetic energy input using an operating means and the technique of determining the magnitude and direction of the second force being a force pulling along the direction of progress of a course in object space described in the present embodiment, and various modification are possible.

The present invention is not restricted to home and arcade game devices, and can also be applied to a simulator, a large attraction device in which many players can participate, a personal computer, a multimedia terminal, a game image generation system circuit board, and various other image generating devices.

What is claimed is:

1. An image generating device generating an image seen from a given viewpoint in an object space, comprising:

an operating means for inputting movements of a player;

means for performing calculation to move at least one moving body along a course in object space based on at least a first force being a force corresponding to kinetic energy of the movements of the player input by the operating means and a second force being a force pulling along a travel direction of the course in object space; and means for generating an image seen from a given viewpoint in object space.

2. The image generating device as defined in claim 1, wherein said kinetic energy is obtained by moving operating means using a player's limb.

3. The image generating device as defined in claim 1, wherein:

said course has vertical relief; and said moving body is moved along said course based on said first and second forces, and a gravity force acting in the vertical direction.

4. The image generating device as defined in claim 2, wherein:

said course has vertical relief; and said moving body is moved along said course based on said first and second forces, and a gravity acting in the vertical direction.

5. The image generating device as defined in claim 1, wherein said second force acting on said moving body is cancelled when said moving body is in a given state.

6. The image generating device as defined in claim 2, wherein said second force acting on said moving body is cancelled when said moving body is in a given state.

7. The image generating device as defined in claim 3, wherein said second force acting on said moving body is cancelled when said moving body is in a given state.

8. The image generating device as defined in claim 1, wherein, when there is a plurality of moving bodies, the magnitude of said second force is varied according to at least one of a distance between moving bodies and rank order of moving bodies.

9. The image generating device as defined in claim 2, wherein, when there is a plurality of moving bodies, the magnitude of said second force is varied according to at least one of a distance between moving bodies and rank order of moving bodies.

10. The image generating device as defined in claim 3, wherein, when there is a plurality of moving bodies, the magnitude of said second force is varied according to at least one of a distance between moving bodies and rank order of the moving bodies.

11. The image generating device as defined in claim 5, wherein, when there is a plurality of moving bodies, the magnitude of said second force is varied according to at least one of a distance between moving bodies and rank order of moving bodies.

12. The image generating device as defined in claim 8, wherein the further the distance between a following moving body and a moving body in the lead on the course, said second force, which acts on the following moving body, is made larger.

13. The image generating device as defined in claim 8, wherein the lower the rank order of a moving body from the leading moving body the larger said second force is made.

14. The image generating device as defined in claim 1, wherein the movement of one of a bicycle, a boat, and an animal is simulated.

15. An information storage medium used for an image generating device generating an image seen from a given viewpoint in an object space, comprising:

a program for processing input movements of a player;

a program for performing calculation to move at least one moving body along a course in object space based on at least a first force being a force read as corresponding to kinetic energy of the input movements of the player and a second force being a force pulling along a travel direction of the course in object space; and a program for generating an image seen from a given viewpoint in object space.

16. The information storage medium as defined in claim 15, wherein said kinetic energy is obtained by moving operating means using a player's limb.

17. The information storage medium as defined in claim 15, wherein:

said course has vertical relief; and said moving body is moved along said course based on said first and second forces, and a gravity force acting in the vertical direction.

18. The information storage medium as defined in claim 15, wherein said second force acting on said moving body is cancelled when said moving body is in a given state.

19. The information storage medium as defined in claim 15, wherein, when there is a plurality of moving bodies, the magnitude of said second force is varied according to at least one of a distance between moving bodies and rank order of moving bodies.

20. The information storage medium as defined in claim 15, wherein the movement of one of a bicycle, a boat, and an animal is simulated.

\* \* \* \* \*